INVENTORS
BENJAMIN BRODSKY
LOUIS J. CORINI
BY
Caesar, Rivise, Bernstein & Cohen
ATTORNEYS.

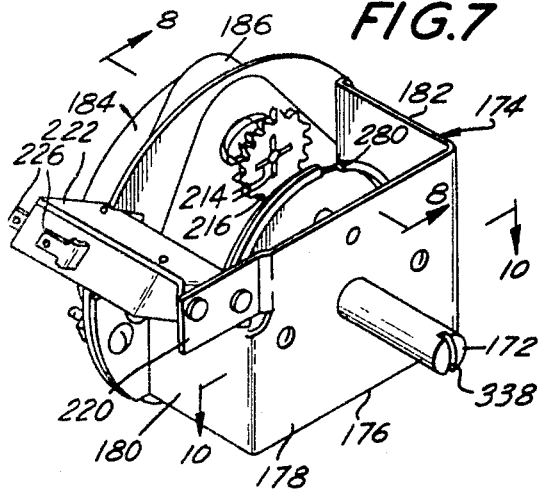
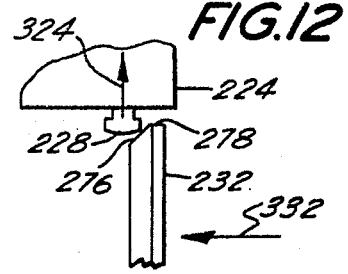
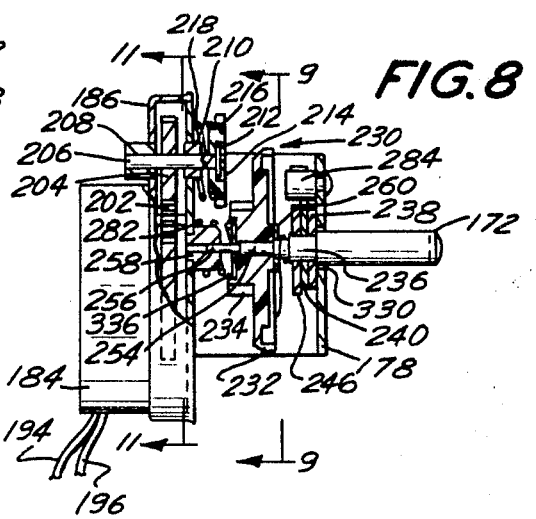
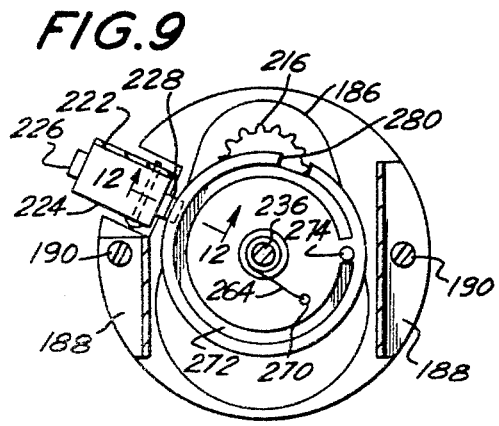
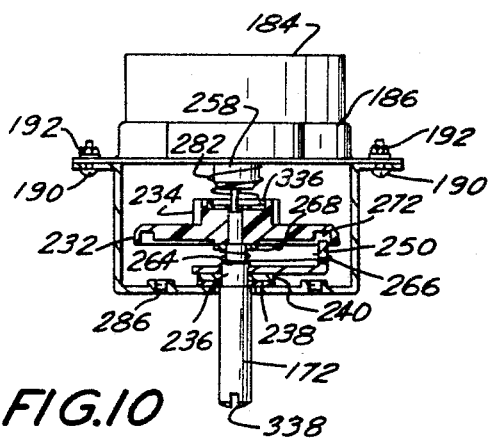

INVENTORS.
BENJAMIN BRODSKY
LOUIS J. CORINI
BY
Caesar, Rivise, Bernstein & Cohen
ATTORNEYS.

United States Patent Office 3,445,039
Patented May 20, 1969

3,445,039
LIQUID DISPENSER WITH TIMER CONTROL
Benjamin Brodsky, Laverock, and Louis J. Corini, Philadelphia, Pa., assignors to Progressive Metal Equipment, Inc. (also known as Progressive Metal Equipment Incorporated), Philadelphia, Pa., a corporation of Pennsylvania
Filed Oct. 31, 1966, Ser. No. 590,663
Int. Cl. B67d 5/08, 5/62; F16l 55/14
U.S. Cl. 222—70                                13 Claims

ABSTRACT OF THE DISCLOSURE

A dispenser comprising a housing and a vessel mounted within the housing for containing liquid. The vessel includes valve means thereon which are openable by actuating means within the housing. A switch means is provided for opening the valve means. The switch means includes timer means which are adjustable to regulate the amount of time the valve means are open.

---

This invention relates to a dispenser for liquid. More particularly, it relates to an improved device adapted for the storage and dispensing of cream for use in restaurants.

Until recently, cream for coffee in restaurants and at snack counters was stored and dispensed from a cannister-type container having a valve therein. The container had insulated walls and an inner vessel which contained the cream. The cream was kept cold by ice which was packed in a separate container and placed on top of the cream vessel or by a ring-shaped jacket which contained a eutectic holdover solution which was cooled in a standard refrigerator and placed around the inner vessel. A lever arm was positioned at the bottom of the cannister. The raising of this lever arm opened a valve within the cannister, thereby permitting the dispensing of cream by gravity.

A number of problems had arisen with the use of the aforementioned cream dispenser. The first was the spoilage of the cream whenever the employees forgot to repack the container with ice during the course of a day. There was also spoilage of cream in the event the cream was left in the dispenser overnight.

Another problem with the aforementioned cream dispenser was that the valve arrangement was not dripproof. Thus, quite often, it was necessary to place a dish under the cream dispenser to catch the drippings after the coffee cup had been removed. The amount of cream dispensed from this prior art dispenser was preset by means of a mechanical portion control. The disadvantage of this control was that the cream was in direct contact with the various control mechanisms, and, therefore, the control did not present a sanitary arrangement. Additionally, before any adjustment of the controls could be made it was necessary to remove all of the cream from the dispenser.

All of the problems presented by the aforementioned dispensers have been solved by the dispenser disclosed and claimed in U.S. Patent No. 3,248,011. Using the dispenser shown in this patent, electrical refrigeration rather than ice keeps the cream cold. In this way, there is no fear of inadvertently neglecting to replenish the ice since the electrical refrigeration system insures that the cream is kept cold at all times.

Another feature of the invention shown in U.S. Patent No. 3,248,011 is that the valve is dripproof. Additionally, the valve is electrically actuated and delivers a predetermined amount of cream each time it is actuated. This predetermined amount of cream is adjustable externally of the cream vessel to suit the needs of a particular user.

The liquid dispenser of this invention is a modification of the dispenser shown in aforementioned Patent No. 3,248,011, and in certain respects provides an improvement over the device shown in said patent. In the patented device, it is necessary to completely drain the cream vessel in order to remove the vessel from its outer container. This is because the means for closing the valve on the cream vessel are separate and apart from the vessel. The device of this invention provides a valve which is an integral part of the cream vessel although it is actuated externally of the vessel.

Another modification of this invention resides in a novel switch arrangement used in combination with the dispenser. Using this switch arrangement varying amounts of cream up to a preset maximum can be dispensed without resetting the portion control. Additionally, the portion control is easily adjusted from the exterior of the dispenser.

It is, therefore, an object of this invention to provide a novel dispenser.

It is another object of this invention to provide a dispenser that is electrically cooled.

It is a further object of this invention to provide an improved dispenser.

It is a further object of this invention to provide an improved dispenser.

It is a further object of this invention to provide a novel valve control for a dispenser.

It is a further object of this invention to provide a novel liquid vessel having an integral valve.

It is a further object of this invention to provide a dispenser having a novel control means for regulating and actuating the dispensing of liquid from the dispenser.

These and other objects of this invention are accomplished by providing a dispenser comprising a casing, a vessel mounted within said casing for containing liquid, means for delivering liquid from said vessel, and valve means on said delivery means, said valve means comprising a bracket mounted on said vessel, and a rod resiliently mounted in said bracket, said rod being longitudinally movable into and out of a sealing position with respect to said vessel.

Other objects and many of the attendant advantages of this invention will be readily appreciated as the same becomes better understood by reference to the following detailed description when considered in connection with the accompanying drawings wherein:

FIG. 5 is a top sectional view showing the valve arrangement for the dispenser of this invention;

FIG. 6 is a partial side sectional exploded view showing the valve on the liquid vessel prior to the insertion of the vessel into the container of the dispenser of this invention;

FIG. 7 is a perspective view of the switch used with this invention;

FIG. 8 is a sectional view taken along the line 8—8 of FIG. 7;

FIG. 9 is a sectional view taken along the line 9—9 of FIG. 8;

FIG. 10 is a sectional view taken along the line 10—10 of FIG. 7;

FIG. 11 is a sectional view taken along the line 11—11 of FIG. 8;

FIG. 12 is a partial bottom plan view taken in the direction of arrows 12—12 of FIG. 9;

Figure 1:
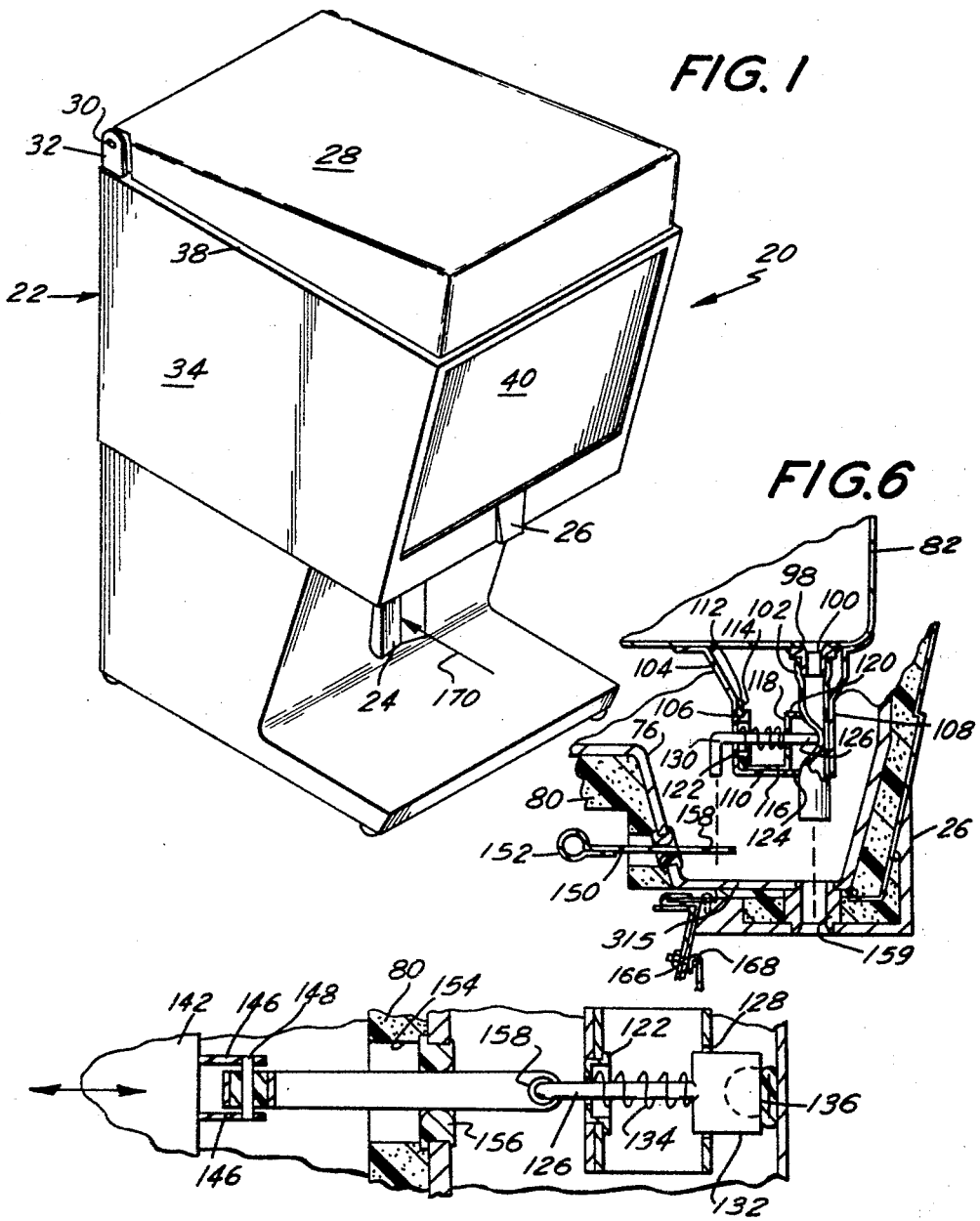
FIG. 1 is a perspective view of the dispenser of this invention.

Referring now in greater detail to the various figures of the drawings wherein similar reference characters refer to similar parts, a dispenser embodying the present invention is generally shown at 20 in FIG. 1. Device 20 basically comprises a housing 22, an actuating plate 24, and a valve housing 26.

Figure 2:
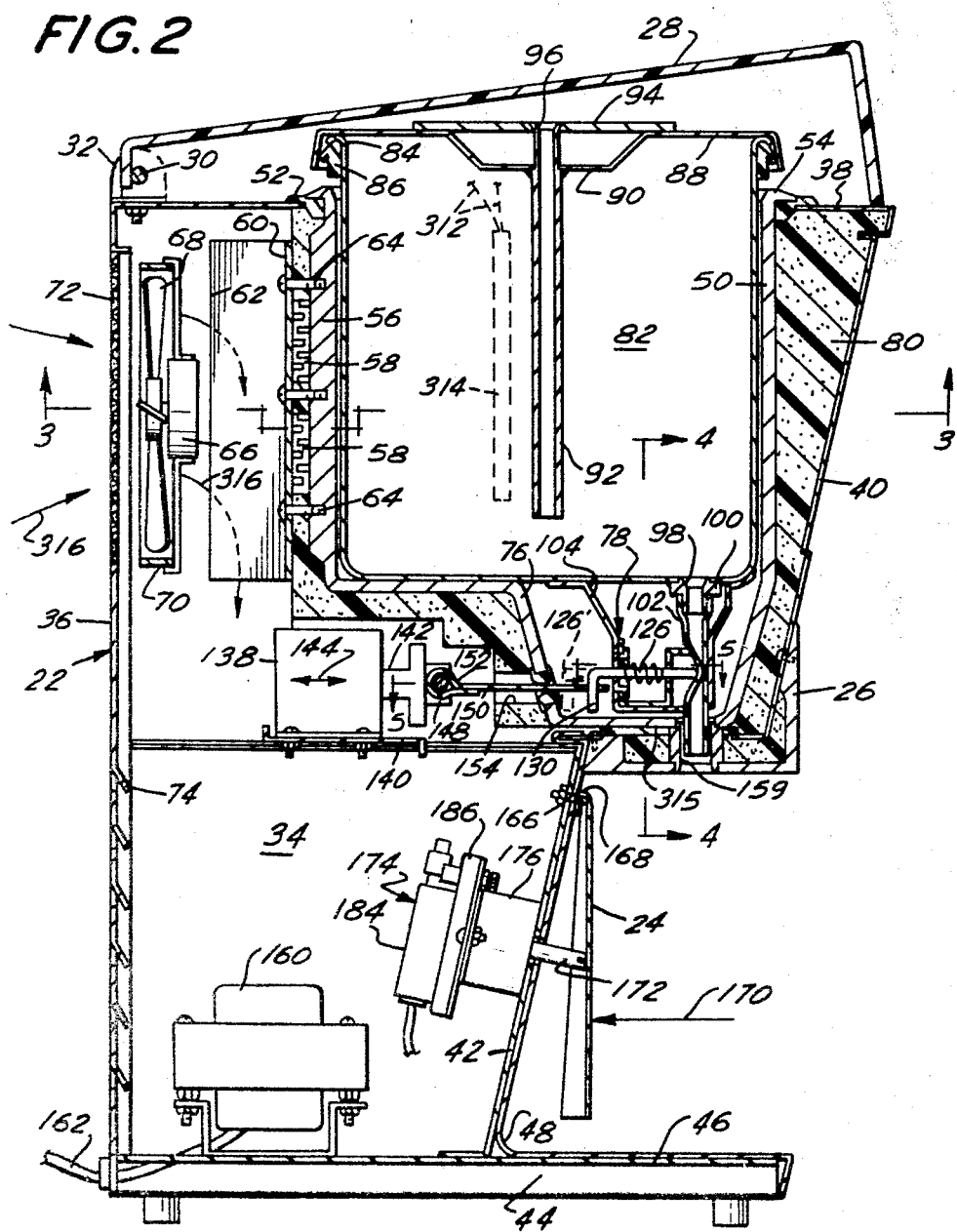
FIG. 2 is a side sectional view of the dispenser of FIG. 1.

As best seen in FIGS. 1 and 2, housing 22 includes a pivotable cover 28. Cover 28 is pivoted around pins 30 which project inwardly from lugs 32 on the top of the housing. Housing 22 additionally includes a pair of side walls 34, a backplate 36, a top ledge 38 which supports cover 28 and a front face 40. Positioned below front face 40 is an inwardly inclined wall 42 which terminates in base 44. As seen in FIG. 2, wall 42 and platform 46 at the forward portion of base 44 have a covering 48 thereon. Covering 48 can be decorative in appearance and can be stainless steel or any of the well known plastic materials.

Figure 3:
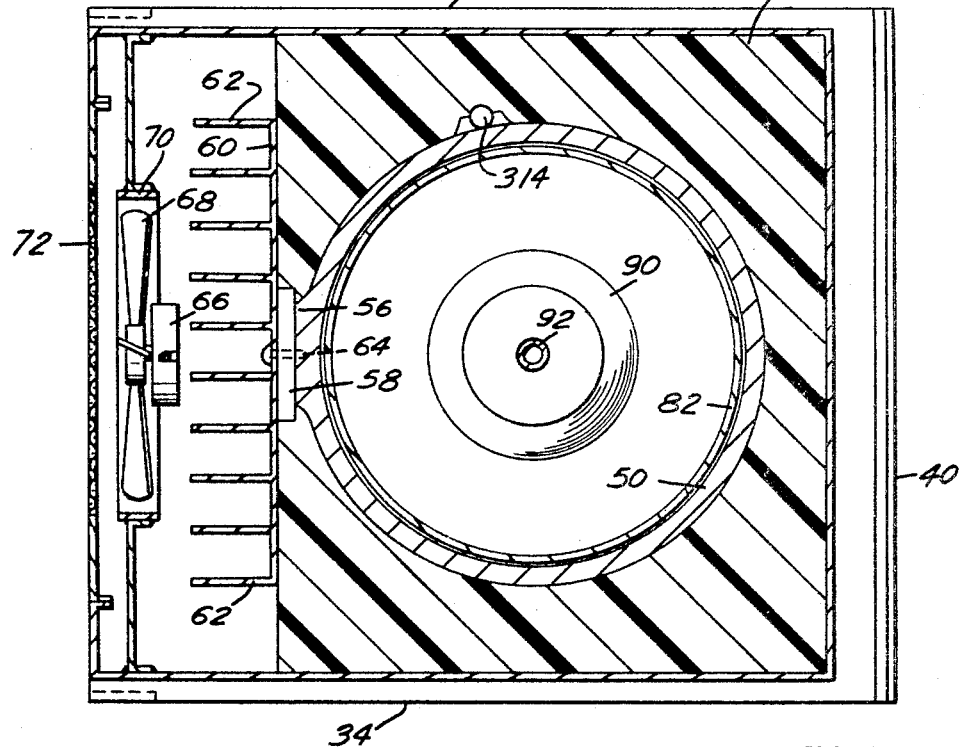
FIG. 3 is a sectional view taken along the line 3—3 of FIG. 2.

Top ledge 38 is provided with a central circular opening which receives metallic container 50. Metallic container 50 is thermally isolated from ledge 38 by gasket 52. Upper lip 54 of container 50 rests on the gasket and is supported by ledge 38. As best seen in FIG. 3, container 50 is basically circular in cross-section but includes a boss 56 on one side thereof which has a flat outer surface.

A pair of vertically aligned thermoelectric modules 58 (FIG. 2) is placed against the outer surface of boss 56. Plate 60 (FIGS. 2 and 3) having cooling fins 62 projecting outwardly therefrom is secured to modules 58. Additionally, plate 60 is secured to boss 56 by bolts 64. As explained in Patent No. 3,248,011 thermoelectric modules have recently become popular in many areas where mechanical refrigeration has previously been used. These modules possess numerous advantages over mechanical refrigeration. The biggest of these advantages is the fact that no moving parts are necessary to obtain the necessary cooling. The basic theory behind the thermoelectric module cooling is that the passage of electric current through a metallic thermocouple results in the transfer of heat from one metal to the other. The discovery of semiconductor thermoelectric materials has made the use of thermoelectric cooling practical for obtaining large temperature variances. Any of the commercial thermoelectric modules can be used with this invention. Thus, Malcor type CP2–31–10 module made by Materials Electronic Products Corporation of Trenton, N.J., could be used.

A motor 66 having fan 68 is mounted behind fins 62 by bracket 70. Fan 68 is positioned adjacent screened portion 72 of back plate 36. Louvers 74 are formed in the lower portion of plate 36, for a purpose to be described hereinafter.

The bottom of container 50 is provided with a well 76 (FIG. 2) for the reception of valve assembly 78. Container 50 and its associated well 76 are insulated from the outer walls of housing 22 by foam 80. Foam 80 is molded in place with appropriate spaces left for modules 58. This foam can comprise any of the insulating foams generally known to the art such as polyurethane foam or polystyrene foam.

A circular removable vessel 82 is positioned within container 50. Vessel 82 includes a downwardly turned upper lip 84. Positioned within lip 84 is a circular gasket 86. Cover 88 for vessel 82 rests on the top of downturned portion 84 and contacts gasket 86. In this way, the cover serves as a seal for the vessel 82. This prevents any foreign substances from getting into the cream or other liquid when the vessel 82 is filled with the cream or other liquid.

The top of cover 88 is provided with a recessed central portion 90. A metal tube 92 passes through a central opening in recessed portion 90 and is welded to the cover.

A bar 94 is secured to the top of tube 92 and is secured to the top of cover 88. As seen in FIG. 2, at 96, the tube 92 passes through bar 94. The purpose of tube 92 is to maintain atmospheric pressure within the vessel 92 as cream is withdrawn from the vessel. Thus, since a substantially airtight seal is provided by cover 88 and gasket 86, the dispensing of cream would draw a vacuum within vessel 82 if contact were not maintained with the atmosphere. The use of tube 92 serves to maintain atmospheric pressure within vessel 82 regardless of the amount of cream remaining in the vessel. This also achieves a constant head for the cream in that the gravity flow proceeds under a constant atmospheric pressure which is independent of the level of cream in the vessel.

Vessel 82 includes an opening 98 at the bottom thereof. A nipple 100 is formed at the opening and projects downwardly therefrom. A compressible tube 102 is telescoped over nipple 100 and is frictionally held thereon. Tube 102 is preferably made of rubber but can be made of any of the resilient plastics known to the art. Bracket 104 is secured to the bottom of vessel 82 as by welding. Bracket 104 includes a pair of substantially vertical sides 106 and 108 and a horizontal bottom 110. Mounted within bracket 104 is a guide 112. Guide 112 includes a vertical leg 114, a horizontal bottom 116, a second vertical leg 118 and a forked flange 120 projecting from the top of leg 118. Guide 112 is held within bracket 104 by bushing 122 which passes through aligned holes in bracket 104 and guide 112. Tube 102 passes downwardly through forked flange 120 and out through hole 124 in bottom 110 of bracket 104.

As best seen in FIGS. 5 and 6, a rod 126 passes through bushing 122 and a hole 128 in vertical leg 118. Rod 126 includes a downwardly projecting finger 130 at one end thereof. The other end of the rod is flattened to form a tab 132 (FIG. 5). A compression spring 134 is telescoped over rod 126 and abuts bushing 122 and tab 132. As seen in FIGS. 5 and 6, the normal tendency of spring 134 is to force tab 132 into engagement with rubber tube 102 which in turn forces the rubber tube against vertical side 108 of bracket 104. This causes a constriction 136 to be formed in the tube thereby serving as a valve for vessel 82.

A solenoid 138 (FIG. 2) is mounted on bracket 140 in housing 22. Solenoid 138 includes a rod 142 which is reciprocable within the solenoid, as indicated by arrows 144. As best seen in FIG. 5, rod 142 has a pair of parallel lugs 146 projecting outwardly therefrom. A pin 148 is mounted horizontally by the lugs. A bar 150 has one end 152 formed into a loop around pin 148. Bar 150 projects through an opening 154 in insulating foam 80. It also passes through an aligned opening in well 76 of container 50. The aligned opening in well 76 has a grommet 156 positioned therein. Grommet 156 is formed from a low coefficient of friction material such as nylon or Teflon (polytetrafluoroethylene), or it can be a hard rubber. Rod 150 will slidably engage grommet 156 during use of the dispenser of this invention. The end of rod 150 includes an opening 158 (FIG. 5). When vessel 82 containing cream or other liquid is inserted in container 50, finger 130 will automatically enter opening 158 in rod 120 as seen in FIG. 6. At the same time, tube 102 will be positioned in tube 159 in valve housing 26.

The current for the thermoelectric modules 58 is obtained through a power conversion and transformer system 160 which includes a transformer, a pair of rectifiers and a choke. A suitable electric cord 162 passes through rear wall 36 and has a three pronged electric plug 164 (FIG. 14) at its end. The purpose of the power conversion and transformer system 160 is to convert the incoming alternating current into direct current at a lower voltage for powering the thermoelectric modules. Power conversion systems of this type are well known in the thermoelectric cooling art.

Actuation of the dispensing of cream from the device of this invention is accomplished by applying pressure against plate 24. As seen in FIGS. 2 and 6, plate 24 is suspended by U-shaped bar 166. The top of plate 24 includes a lip 168 which hangs on bar 166 and is thus pivotally mounted thereon. The pressure against plate 24 in the direction of arrow 170 (FIG. 2) will in turn push finger 172 of timing switch 174 inwardly, thereby actuating and regulating the dispensing of cream from vessel 82.

Timing switch 174 is shown in detail in FIGS. 7 to 13. As best seen therein, the switch includes a U-shaped bracket 176 having a front face 178 and side walls 180 and 182. A motor 184 and gear box 186 are secured to flanges 188 (FIG. 9) of bracket 176 by bolts 190 and associated nuts 192. The electric power for motor 184 is obtained through leads 194 and 196 (FIG. 8). When started, motor 184 will drive gear 198 (FIG. 11) which is on a common shaft 200 with the motor. Gear 198 will in turn drive gear 202 which in turn drives gear 204.

As seen in FIG. 8, shaft 206 of gear 204 is journalled at 208 and 210 and projects outwardly of the gear box 186. A pin 212 is mounted in shaft 206 at one end thereof. Pin 212 is received in one of the cross slots 214 (FIG. 7) of external gear 216. A compression spring 218 abuts gear box 186 and external gear 216 (FIG. 8).

Gear 216 is freely rotatable and slidable on shaft 206. However, the action of spring 218 against the gear forces the gear to the forwardmost position shown in FIG. 8. While in this position, pin 212 is received in one of the slots 214 and therefore the gear 216 will rotate with shaft 206. Gear 216 is made from a plastic material with a low coefficient of friction, such as nylon or Teflon. When the gear is rotating the spring 218 will remain stationary and the gear can freely rotate against the spring.

Front face 178 of bracket 176 includes an outwardly projecting flange 220 (FIG. 7). A plate 222 is angularly mounted on flange 220. Microswitch 224 having contact elements 226 is mounted on the underside of plate 222. Microswitch 224 includes a resilient finger 228. Finger 228 is spring mounted and in its normal condition it projects outwardly from the microswitch 224. While in this position the microswitch is in an open condition.

Figure 13:
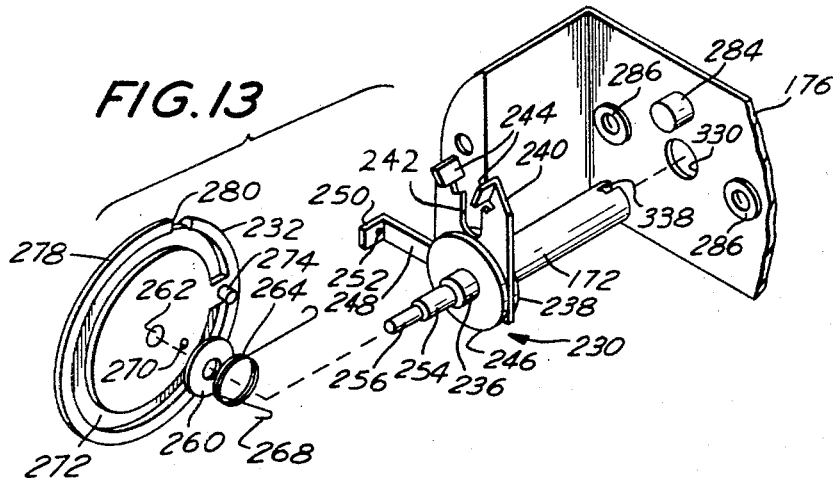
FIG. 13 is an exploded perspective view showing a number of the elements of the switch of FIG. 7.

The actuating assembly for the timing mechanism is generally shown at 230 in the exploded view of FIG. 13. Device 230 includes a gear wheel 232 having a gear 234 (FIG. 8) on the front surface thereof. Finger 172 includes a first reduced portion 236 thereon. A washer 238 is telescoped over reduced portion 236 and will abut wall 178 of bracket 176 in the assembled condition of the switch (FIG. 8). A yoke 240 is also telescoped over reduced portion 236 and abuts washer 238. Yoke 240 includes a downwardly extending vertical slot 242 and forwardly projecting flanges 244 adjacent the slot.

A second washer 246 is telescoped over reduced portion 236 and abuts yoke 240. Washer 246 includes an outwardly projecting arm 248 having a flange 250 on its end. Flange 250 includes opening 252. Washers 238 and 246 and yoke 240 are secured on reduced section 236 by a pressed fit. The rotation of finger 172 results in the rotation of washers 238 and 246 whereas the yoke 240 will remain stationary during rotation of the finger as will be explained hereinafter.

Finger 172 includes a second reduced portion 254 which is contiguous with reduced portion 236. As seen in FIG. 8 gear wheel 232 is positioned on reduced portion 254 and is freely rotatable thereon.

Finger 172 includes a third reduced portion 256 which is contiguous with reduced portion 254. Portion 256 is journalled in bearing 258 (FIG. 8) and is freely rotatable and slidable therein.

In assembling the actuating mechanism 230, as seen in FIG. 8, a washer 260 is telescoped over reduced portion 254 and is placed adjacent opening 262 in the gear wheel. A coiled tension spring 264 is telescoped over the forward section of reduced portion 236 and has one end 266 received in the hole in flange 250 (FIG. 10). The other end 268 of tension spring 264 is received in hole 270 (FIGS. 10 and 13) of gear wheel 232.

The rear surface of gear wheel 232 includes a circular slot 272. Slot 272 is aligned with flange 250, as seen in FIG. 10. As gear wheel 232 is rotated, the flange will be positioned within slot 272. A pin 274 (FIG. 13) is positioned in slot 272.

As best seen in FIG. 12, gear wheel 232 includes a bevelled edge 276 which is adapted to contact finger 228 in microswitch 224. Bevelled edge 276 is contiguous with an outer circular rim 278 on the gear wheel. As seen in FIG. 13, rim 278 includes a recess 280 in its circumference. A coiled compression spring 282 is telescoped over bearing 258 (FIG. 10) and abuts gear box 186 and gear 234. The normal tendency of spring 282 is to force gear wheel 232 outwardly and away from gear box 186.

Timing switch 174 also includes a lug 284 on the inner face of bracket 176. Lug 284 is received in slot 242 of yoke 240 (FIG. 8). Bracket 176 additionally includes a pair of tapped holes 286 which are used in the mounting of switch 174 on wall 42 (FIG. 2).

Switch 174 is disclosed and claimed in U.S. application Ser. No. 507,411, filed Nov. 12, 1965. No claim is made to the switch itself. A complete description of the switch has been given above and its function will be hereinafter described for the purpose of showing the use of the switch in combination with the remaining parts of the dispenser of this invention. The claims of this application which embody the switch are made solely on the basis of the novel combination of elements which include the switch and no claim is made to the details of the switch itself alone and apart from the combination of elements recited.

Figure 14:
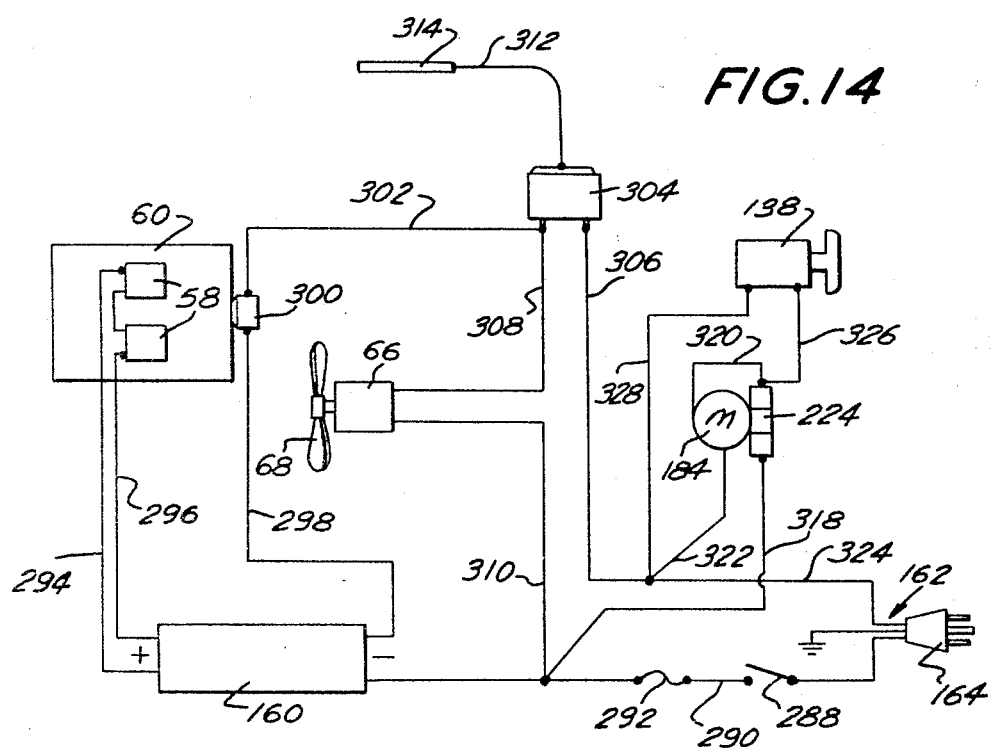
FIG. 14 is a wiring diagram for the dispenser of this invention.

A wiring diagram for the dispenser of this invention is shown in FIG. 14. In use, the dispenser is actuated by inserting plug 164 into an electrical outlet and closing manually controlled switch 288. The closing of switch 288 automatically actuates the cooling system of the dispenser. Thus, a completed circuit is made through lead 290, fuse 292, power conversion and transformer unit 160, lead 294, modules 58, lead 296, power conversion unit 160, lead 298, thermal protector 300, lead 302, thermostat 304, and lead 306. At the same time, the fan motor 66 is actuated through leads 308 and 310. The purpose of thermal protector 300 is to protect the modules 58 in the event that fan motor 66 should fail and the modules should start to overheat. Overheating of the modules will destroy them. In essence, thermal protector 300 serves the same function as a fuse.

Thermostat 304 is connected through leads 312 to thermostat bulb 314. As seen in FIGS. 2 and 3, the thermostat bulb is in contact with container 50 and will readily determine the temperature of the container. Since the container 50 is in contact with metal container 82, the temperature of the cream within the container 82 can easily be regulated through the thermostat bulb 314 and its associated thermostat.

Referring now to FIG. 2, it is seen that as soon as the dispenser 20 is actuated, the cream within container 82 will be kept cold by modules 58 which have their cold sides in contact with boss 56 of container 50. The hot surface of modules 58 is in contact with plate 60 and cooling fins 62. Therefore the heat generated by the modules will be dissipated through all of the fins. This heat is then expelled by means of fan 68. As seen in FIG. 2, fan 68 will draw air through screened portion 72, as shown by arrows 316, and pass the air downwardly through the fins. After passing through the fins, the air passes downwardly through housing 22, across the power conversion and transformer unit 160, and out through louvers 74 in rear wall 36. In this manner the fan 68 serves to cool the entire interior of housing 22.

Figure 4:
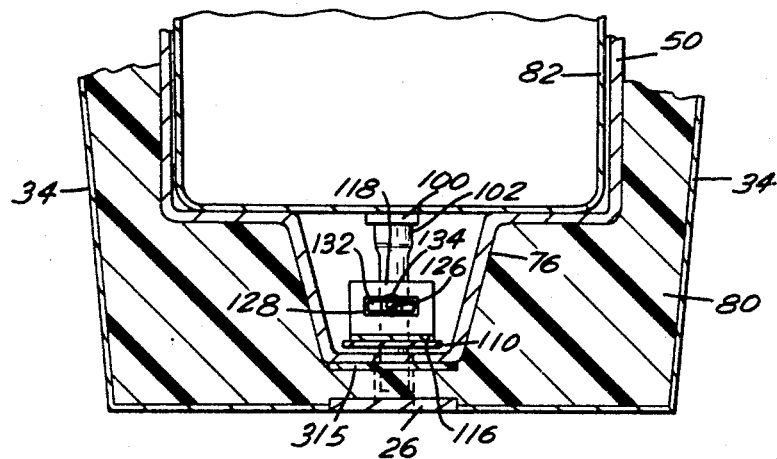
FIG. 4 is a sectional view taken along the line 4—4 of FIG. 2.

As explained above, since container 50 and vessel 82 are both metallic, heat will be transferred from the vessel 82 through the container 50 and out through modules 58 thereby chilling the cream within the vessel. The vessel is insulated from the housing by foam insulation 80. Additionally, gasket 52 thermally isolates the container from ledge 38 and plastic insulator plate 315 (FIGS. 2, 4 and 6) insulates well 76 of the container from the walls of the housing.

It is seen by reference to FIG. 14 that the cooling system is entirely independent of the dispensing system. Thus, microswitch 224 which controls the dispensing system is normally in an open condition. The depression of finger 172 closes microswitch 224 as will be explained hereinafter. The closing of microswitch 224 completes a circuit through lead 290, lead 318, lead 320, motor 184, lead 322 and lead 324. As will be explained hereinafter the motor and its associated gearing act to limit the amount of cream which will be dispensed when the microswitch 224 is closed.

Additionally, with the closing of microswitch 224 solenoid 138 is actuated by the completion of a circuit through microswitch 224, lead 326, the solenoid, lead 328 and lead 324. Referring now to FIGS. 2 and 5, it will be seen that the actuating of solenoid 138 results in the movement of rod 142 into the solenoid, or to the left as viewed in FIGS. 2 and 5. This in turn results in the movement of bar 150 to the left which in turn will move rod 126 to the left to the position shown at 126' in FIG. 2. When the rod 126 is moved to the left, the pressure against rubber tube 102 is withdrawn and the constriction 136 is removed. At this time, cream will be dispensed from vessel 82 through tube 102 and into a coffee cup or other container positioned below tube 102, as viewed in FIG. 2. In normal practice, a coffee cup will be placed on platform 46 and pressed against plate 24 in the direction of arrow 170. This will cause the dispensing of cream directly into the coffee cup on the platform.

When microswitch 224 is opened again, either by the completion of a dispensing cycle or by the removal of pressure from plate 24, solenoid 138 will be deactivated. Rod 126 and its associated tab 132 will immediately be returned to the position shown in FIG. 5 by the force of spring 134. This in turn will return solenoid rod 142 to the position shown in FIG. 2.

One of the features of this invention is the fact that vessel 82 can be removed from the container 50 while the vessel still contains cream. This is because the valve assembly 78 forms an integral part of the vessel. In the device shown in Patent No. 3,248,011, vessel 42 could conveniently be removed for cleaning of the device only after all of the cream or other liquid had been drained from the vessel. This was because the valve for the vessel was completely independent of the vessel and any attempt to remove the vessel with cream in it would result in leakage of the cream within the container housing the vessel. As best seen in FIG. 6, vessel 82 is in a normally sealed condition by the action of rod 126 against tube 102. The insertion of the vessel into container 50 automatically seats finger 130 in hole 158 of bar 150. Thereafter, the opening of the valve on the vessel is controlled by the bar and solenoid 138 as explained above.

The dispensing and limiting of the amount of cream dispensed from vessel 82 is controlled by switch 174. The actuation of the switch occurs by pressure against plate 24 (FIG. 2) in the direction of arrow 170 which will in turn depress finger 172. As seen in FIG. 8, the depression of finger 172 will cause the finger to move longitudinally within hole 330 (FIGS. 8 and 13) of bracket 176. The axial alignment of finger 172 is maintained by the longitudinal movement of reduced section 256 in bearing 258.

In the normal position for gear wheel 232, as shown in FIG. 8, spring 282 will force the gear wheel outwardly with washer 238 abutting the inside face of plate 178 of bracket 176. While in this position, gear wheel 232 will be positioned outwardly of finger 228 of microswitch 224, as best seen in FIG. 12. Depression of finger 172 causes gear wheel 232 to move inwardly as shown by arrow 332 in FIG. 12. This in turn causes finger 228 of the microswitch 224 to ride upon bevelled surface 276 of the gear wheel 232. The contact of finger 228 with the bevelled surface causes the inward movement of the finger in the direction of arrow 334, thereby closing the microswitch. Continued pressure against the finger 172 will cause finger 228 to rest on rim 278 of the gear wheel. At this point the microswitch 224 will still be closed. After a predetermined amount of cream has been released from the dispenser, which release is caused by the closing of the microswitch as seen in the wiring diagram of FIG. 14 as explained above, pressure against plate 24 is released. Thereafter, spring 282 will return gear wheel 232 to the position shown in FIG. 12, thereby again opening the microswitch and ceasing further dispensing of liquid from vessel 82.

The method of dispensing cream described above is effective for the dispensing of any desired amount of cream. However, in actual practice, the same amount of cream normally will be used in most cups of coffee sold in a restaurant. For this reason, switch 174 is adjustable to deliver a predetermined amount of cream whereby the same amount of cream will be dispensed every time plate 24 is depressed. This is accomplished by depressing finger 172 which will automatically engage gear 234 in gear 216. As described above, the depression of finger 172 automatically closes microswitch 224, as seen in FIG. 12. Referring again to FIG. 14, it is seen that the closing of the microswitch also causes the actuation of solenoid 138 which institutes the dispensing of cream. Likewise, the closing of the microswitch actuates motor 182 which in turn causes the rotation of gear 216. The depression of finger 172 causes the forward movement of gear wheel 232. As seen in FIG. 8, this forward movement will result in the intermeshing of gear 216 and gear 234. In order to prevent any damage to gears 216 or 234, or to motor 184, during the meshing of the gears, gear 216 is slidably and rotatably mounted on shaft 206 and is resiliently mounted by spring 218. Therefore, when gear 234 is brought into contact with rotating gear 216, any difficulty with respect to the intermeshing of gears will result in the rearward movement of gear 216 until the gear teeth have properly meshed. If gear 216 were rigidly mounted, there would be the possibility of damage to the gear teeth in the event of failure to properly mesh when the gears are brought together or the possibility of damage to motor 184.

After gears 216 and 234 are meshed, gear wheel 232 will be rotated on reduced portion 254 of finger 172. Gear wheel 232, like gear 216, is made of a plastic material with a low coefficient of friction, such as nylon or Teflon. Therefore, the gear wheel 232 is freely rotatable on the reduced portion. Furthermore, spring 282 which abuts the gear wheel 232 remains stationary while the gear wheel is rotating. This is possible in view of the plastic material from which gear wheel 232 is made. However, in order to facilitate the rotation of the gear wheel relative to the spring 282, and in order to prevent wear on the gear wheel, a bearing cup 336 which can be made of a low coefficient of friction metal is inserted in the front face of gear 234 (FIGS. 8 and 10).

The rotation of gear 216 causes the rotation of the intermeshed gear 234, which in turn results in the rotation of rim 278. During the entire time that the rim 278 is rotating finger 228 on microswitch 224 will be depressed thereby maintaining the microswitch in a closed position. Microswitch 224 will remain closed until notch 280 (FIG. 9) in rim 278 rotates into the position of microswitch finger 228. When this occurs, finger 228 will be resiliently forced into notch 280 thereby opening microswitch 224. This immediately stops the motor 184 and deactivatives solenoid 138. With the deactivation of solenoid 138, spring 134 (FIG. 5) returns tab 132 to its sealing position, thereby preventing any further dispensing of cream.

So long as finger 172 is depressed and finger 228 remains in notch 280, there can be no further dispensing of cream from dispenser 20. Therefore, should a waitress inadvertently leave a coffee cup in pressure engagement with plate 24, there is no fear that the device will continually dispense cream until the cup is removed. Using the switch 174 it is assured that the maximum amount of cream which will be dispensed whenever finger 172 is depressed will be no greater than the amount set on the switch by the user of the dispenser.

If a greater amount of cream is desired than the maximum amount which can be delivered during one cycle, all that is necessary is to remove the pressure from plate 24 which in turn removes pressure from finger 172. Spring 282 immediately returns gear wheel 232 to the position shown in FIG. 10, and out of engagement with gear 216 and finger 228. Coiled spring 264 then rotates gear wheel 232 in a clockwise direction, as viewed in FIG. 7. Gear wheel 232 will continue to rotate in this direction until pin 272 (FIG. 13) contacts flange 250 which is positioned in groove 272. The axial movement of finger 172 is maintained by lug 284 and yoke 240. Thus, whenever finger 172 is depressed there is no fear of any rotational movement of the finger because the flanges 244 abutting lug 284 will assure the continual axial movement.

The maximum amount of time that finger 228 of microswitch 224 will be depressed, and thus the maximum amount of cream which will be dispensed when finger 172 is depressed is readily adjustable. In order to accomplish adjustment of the timing switch a screwdriver or other bladed device is inserted into slot 338 of finger 172. Referring to FIG. 13 it will be seen that rotation of finger 172 will in turn rotate washers 238 and 246 which are secured thereon by a pressed fit. Yoke 240 which is also frictionally held on finger 172 will not be rotated because abutment of flanges 244 against lug 284 will prevent rotation of the yoke. When washer 246 is rotated by the rotation of finger 172, arm 248 and its associated flange 250 are also rotated. Since flange 250 in combination with pin 274 serves as a stop for the return movement of gear wheel 232 under the urging of spring 264, the maximum amount of movement of the gear wheel is thus controlled through the rotation of finger 172.

As pointed out above, the starting position for notch 280 in rim 278 when the gears 216 and 234 are enmeshed is determined by the location of flange 250 which serves as a stop for the rotational movement of the gear wheel. Therefore, if a greater amount of cream is desired, finger 172 will be rotated in a counterclockwise direction as viewed in FIG. 13. On the other hand, if a smaller amount of cream is desired, finger 172 will be rotated in a clockwise direction as viewed in FIG. 13.

Once the setting for the flange 250 has been made, the same amount of cream will always be dispensed every time finger 172 is depressed, until such time as the setting is changed. This is because the finger 172 is prevented from moving in a rotational direction by the abutment of flanges 244 on lug 284. The frictional fit of yoke 240 on finger 172 is sufficiently great to prevent inadvertent rotation of the finger while at the same time sufficiently loose to permit rotation of the finger by a screwdriver or other bladed object. Since a constant pressure head is maintained on the cream within vessel 82 through the provision of tube 92, the amount of cream dispensed for a given period of time during which microswitch 224 is closed will always be the same.

It is thus seen that the dispenser of this invention is useful for dispensing any amount of cream desired up to a maximum preset amount. If less than the maximum amount is desired, all that is necessary is to immediately release the pressure against finger 172 which will immediately terminate the dispensing of cream. If, on occasion, more than the preset amount is desired, the finger 172 is depressed until the preset amount is delivered, the pressure against the finger is removed, and then reapplied until a sufficient additional amount of cream is delivered.

The dispenser of this invention provides a number of advantages over the dispenser shown in Patent No. 3,248,011. One of the advantages is that the setting for the amount of cream delivered is easily regulated from the exterior of the dispenser by merely rotating finger 172. In the device shown in Patent No. 3,248,011, in order to make any adjustments in the amount of cream delivered it was necessary to remove the back plate of the dispenser and make the adjustment within the dispenser housing.

Another advantage of the device of this invention over that shown in Patent No. 3,248,011 is that the amount of cream dispensed can be regulated each time the dispenser is used. Thus, if only a small amount of cream is desired, finger 172 is only depressed for a short period of time. In the device shown in Patent No. 3,248,011 once the dispensing was actuated only a preset amount of cream could be obtained and the only way the amount of cream dispensed could be adjusted was to make the necessary internal adjustments specified above.

It should be specifically understood, however, that the device disclosed and claimed in Patent No. 3,248,011 is completely satisfactory in all respects for its intended purposes. The device of this invention does enjoy the specified advantages over the prior device. However, to this day the prior device has proved entirely satisfactory in operation and there is every reason to believe that it will continue to do so.

The device of this invention can be made from the same materials as those used in the device of Patent No. 3,248,011. Thus, the container 50 is made of any heat conductive metal such as steel or aluminum. Vessel 82 is also formed from a heat conductive metal. Stainless steel is a preferred metal for the vessel for sanitary reasons.

Although this invention has been specifically described with respect to the storage and dispensing of cream, it is to be understood that the dispenser of this invention is applicable to the storage and dispensing of any liquid. The valve arrangement on vessel 82 provides a dripproof, remotely openable valve which can be used in various dispensing devices other than the device specifically disclosed.

Without further elaboration, the foregoing will so fully illustrate our invention, that others may, by applying current or future knowledge, adapt the same for use under various conditions of service.

What is claimed as the invention is:

1. A dispenser comprising a housing, a vessel mounted within said housing for containing liquid, liquid delivery means on said vessel, and valve means on said delivery means, said delivery means comprising a compressible tube secured to said vessel, said valve means comprising a bracket mounted on said vessel and a rod resiliently mounted in said bracket, said rod being longitudinally movable into and out of sealing position with respect to said compressible tube, whereby said rod compresses said tube when in said sealing position, said rod including means adapted to engage means for longitudinally moving said rod, said means for moving said rod comprising a longitudinally movable bar mounted in said housing, with said bar and said rod being releasably hooked together.

2. The dispenser of claim 1 wherein said rod is resiliently mounted in said bracket and urged against said tube.

3. The dispenser of claim 2 wherein said rod includes a tab at one end thereof, said tab being adapted to compress said tube.

4. The dispenser of claim 1 wherein said bar is adapted to be moved by electrical actuating means.

5. The dispenser of claim 4 wherein said electrical actuating means comprises a solenoid having a rod therein, said rod being connected to said bar.

6. The dispenser of claim 1 and further including means to cool said vessel.

7. The dispenser of claim 6 wherein said cooling means comprises at least one thermoelectric module.

8. The dispenser of claim 1 and further including means for covering and sealing said vessel, and means for maintaining atmospheric pressure within said vessel.

9. The dispenser of claim 8 wherein said means for maintaining atmospheric pressure within said vessel comprises a tube depending from said covering means into said vessel.

10. The dispenser of claim 1 wherein said rod has a downwardly projecting finger thereon, and said bar has an opening formed therein, whereby said rod is hooked to said bar by placing said finger in said opening when said vessel is placed within said housing.

11. A dispenser comprising a housing, a vessel mounted within said housing for containing liquid, liquid delivery means on said vessel, valve means on said delivery means, said delivery means comprising a compressible tube secured to said vessel, said valve means comprising a bracket mounted on said vessel and a rod resiliently mounted in said bracket, said rod being longitudinally movable into and out of sealing position with respect to said compressible tube, whereby said rod compresses said tube when in said sealing position, said rod including means adapted to engage means for longitudinally moving said rod, said means for moving said rod comprising a longitudinally movable bar mounted in said housing, said bar being adapted to be moved by electrical actuating means, and switch means for actuating said electrical actuating means, said switch means including timer means, said timer means being adjustable, said switch means adapted to cause the dispensing of any desired amount of liquid up to a predetermined maximum amount whenever said switch means is actuated, with said predetermined maximum amount being adjustable.

12. The dispenser of claim 11 wherein said switch means is adjustable externally of said housing.

13. The dispenser of claim 11 wherein said valve means are automatically closed when said predetermined maximum amount of liquid is dispensed.

References Cited

UNITED STATES PATENTS

| | | | |
|---|---|---|---|
| 2,274,409 | 2/1942 | Harbison | 222—183 |
| 2,652,222 | 9/1953 | McCowan | 251—5 |
| 3,195,788 | 7/1965 | Wilson | 251—9 |
| 2,487,999 | 11/1949 | Baverlein et al. | 222—325 X |
| 3,119,527 | 1/1964 | Dyer | 222—70 |
| 3,248,011 | 4/1966 | Brodsky et al. | 222—183 X |
| 3,250,130 | 5/1966 | Lozano | 251—7 X |
| 3,258,166 | 6/1966 | Kuckens | 222—70 |
| 3,285,474 | 11/1966 | Gran | 222—183 X |
| 3,300,092 | 1/1967 | Williams | 222—70 |

FOREIGN PATENTS 1,017,647  12/1952  France.

ROBERT B. REEVES, *Primary Examiner.*

H. S. LANE, *Assistant Examiner.*

U.S. Cl. X.R.

222—146, 183, 504; 251—7